US011861494B2

(12) United States Patent
Felip Leon et al.

(10) Patent No.: US 11,861,494 B2
(45) Date of Patent: Jan. 2, 2024

(54) NEURAL NETWORK VERIFICATION BASED ON COGNITIVE TRAJECTORIES

(71) Applicant: Intel Corporation, Santa Clara, CA (US)

(72) Inventors: Javier Felip Leon, Hillsboro, OR (US); Javier Sebastian Turek, Beaverton, OR (US); David Israel Gonzalez Aguirre, Hillsboro, OR (US); Ignacio J. Alvarez, Portland, OR (US); Javier Perez-Ramirez, North Plains, OR (US); Mariano Tepper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 16/913,318

(22) Filed: Jun. 26, 2020

(65) Prior Publication Data
US 2020/0327415 A1     Oct. 15, 2020

(51) Int. Cl.
| | |
|---|---|
| *G06N 3/08* | (2023.01) |
| *G06N 3/06* | (2006.01) |
| *G06N 3/008* | (2023.01) |
| *G06N 3/04* | (2023.01) |
| *G06N 7/06* | (2006.01) |
| *G06N 3/045* | (2023.01) |
| *G06N 3/0455* | (2023.01) |

(52) U.S. Cl.
CPC ............... *G06N 3/08* (2013.01); *G06N 3/008* (2013.01); *G06N 3/04* (2013.01); *G06N 3/045* (2023.01); *G06N 3/0455* (2023.01); *G06N 7/06* (2013.01)

(58) Field of Classification Search
CPC ........ G06N 3/08; G06N 3/0455; G06N 3/045; G06N 3/008; G06N 3/04; G06N 7/06
See application file for complete search history.

(56) References Cited

U.S. PATENT DOCUMENTS

| | | | | |
|---|---|---|---|---|
| 6,885,907 | B1* | 4/2005 | Zhang | B22D 11/16 |
| | | | | 164/151.5 |
| 10,928,820 | B1* | 2/2021 | Tao | G05D 1/0214 |
| 11,157,010 | B1* | 10/2021 | Narang | G06F 18/2155 |

(Continued)

FOREIGN PATENT DOCUMENTS

| | | | | | |
|---|---|---|---|---|---|
| CN | 109255284 | A | * | 1/2019 | ......... G06K 9/00362 |
| CN | 109344717 | A | * | 2/2019 | ......... G06K 9/00771 |
| CN | 109255284 | B | * | 2/2021 | ......... G06K 9/00362 |
| DE | 102019209228 | A1 | * | 12/2020 | ......... G06K 9/00805 |

OTHER PUBLICATIONS

Chen et al., "Dimensionality Reduction for Motion Planning of Dual-Arm Robots", Aug. 8, 2018, IEEE, pp. 718-723 (Year: 2018).*

(Continued)

*Primary Examiner* — Paulinho E Smith
(74) *Attorney, Agent, or Firm* — Jordan IP Law, LLC

(57) ABSTRACT

Systems, apparatuses and methods may provide for technology that identifies a cognitive space that is to be a compressed representation of activations of a neural network, maps a plurality of activations of the neural network to a cognitive initial point and a cognitive destination point in the cognitive space and generates a first cognitive trajectory through the cognitive space, wherein the first cognitive trajectory traverses the cognitive space from the cognitive initial point to the cognitive destination point.

25 Claims, 9 Drawing Sheets

(56) References Cited

U.S. PATENT DOCUMENTS

| | | | |
|---|---|---|---|
| 2017/0206696 A1* | 7/2017 | Bailey | G06T 13/40 |
| 2019/0156548 A1* | 5/2019 | Bailey | G06T 7/20 |
| 2020/0074707 A1* | 3/2020 | Lee | G06T 11/00 |
| 2020/0125959 A1* | 4/2020 | Beyene | G06N 3/04 |
| 2020/0166928 A1* | 5/2020 | Sudarsan | H04W 4/021 |
| 2020/0223443 A1* | 7/2020 | Gonzalez Aguirre | B60W 60/00182 |
| 2020/0310541 A1* | 10/2020 | Reisman | G06F 3/017 |
| 2020/0327963 A1* | 10/2020 | Ul Ain | G16C 20/70 |
| 2020/0361083 A1* | 11/2020 | Mousavian | B25J 9/1669 |
| 2021/0133582 A1* | 5/2021 | Refaat | G06N 3/045 |
| 2021/0138655 A1* | 5/2021 | Mousavian | B25J 9/1666 |
| 2021/0146531 A1* | 5/2021 | Tremblay | G06N 20/00 |
| 2021/0217484 A1* | 7/2021 | Giessel | G16B 40/00 |
| 2021/0282701 A1* | 9/2021 | Chan | A61B 5/37 |
| 2021/0397945 A1* | 12/2021 | Vahdat | G06N 3/047 |
| 2022/0011776 A1* | 1/2022 | Narang | G06N 3/084 |
| 2022/0026913 A1* | 1/2022 | Narang | B60W 60/0011 |
| 2022/0188568 A1* | 6/2022 | Singh | G06V 10/772 |

OTHER PUBLICATIONS

Bellmund et al., "Navigating Cognition: Spatial Codes for Human Thinking," Science, vol. 362, Issue 6415, Nov. 9, 2018, 25 pages.

Goodfellow et al., "Chapter 14: Autoencoders," Deep Learning, MIT Press, 2016, pp. 499-523.

Grathwohl et al., "Your Classifier is Secretly an Energy Based Model and You Should Treat It Like One," arXiv:1912.03263v2, Dec. 11, 2019, 22 pages.

Katz et al., "The Marabou Framework for Verification and Analysis of Deep Neural Networks," International Conference on Computer Aided Verification, Jul. 2019, 10 pages.

Henne et al., "Benchmarking Uncertainty Estimation Methods for Deep Learning with Safety-Related Metrics," ceur-ws.org/Vol-2560/paper35.pdf, 2020, 8 pages.

Bahadur et al., "Dimension Estimation Using Autoencoders," arXiv:1909.10702, Sep. 24, 2019, 11 pages.

Goodfellow et al., "Generative Adversarial Nets," International Conference on Neural Information Processing Systems, 2014, 9 pages.

Rosenblatt, Murray, "Remarks on Some Nonparametric Estimates of a Density Function," The Annals of Mathematical Statistics, 1956, pp. 832-837.

Parzen, Emanuel, "On Estimation of a Probability Density Function and Mode". The Annals of Mathematical Statistics, 1962, pp. 1065-1076.

Taigman et al., "DeepFace: Closing the Gap to Human-Level Performance in Face Verification," CVPR, 2014, 8 pages.

Sharif et al., "AdversarialGenerative Nets: Neural Network Attacks on State-of-the-Art Face Recognition," arXiv:1801.00349v1, Dec. 31, 2017, 16 pages.

* cited by examiner

NEURAL NETWORK VERIFICATION BASED ON COGNITIVE TRAJECTORIES

TECHNICAL FIELD

Embodiments generally relate to generating cognitive spaces and verifying/validating neural networks based on trajectories in the cognitive spaces. More particularly, embodiments relate to mapping a reasoning process of a neural network into a cognitive space to identify a validity of the reasoning process.

BACKGROUND

Neural network (also referred to as artificial neural networks) may be computing systems that learn to perform tasks without being programmed for specific actions with respect to the tasks. Due to modifications the neural network may autonomously implement during training, the process that a neural network based system undertakes to generate an output from a given input may not be interpretable by humans. Therefore, it becomes difficult to debug, test, interpret and evaluate for certain characteristics such as resiliency against adversarial attack, accuracy and efficiency. For example, the neural network may independently adapt (e.g., modify internal weights and processes) as the neural network learns. As such, the process that the neural network uses to generate an output may be opaque to a developer due to the independent adaptions.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
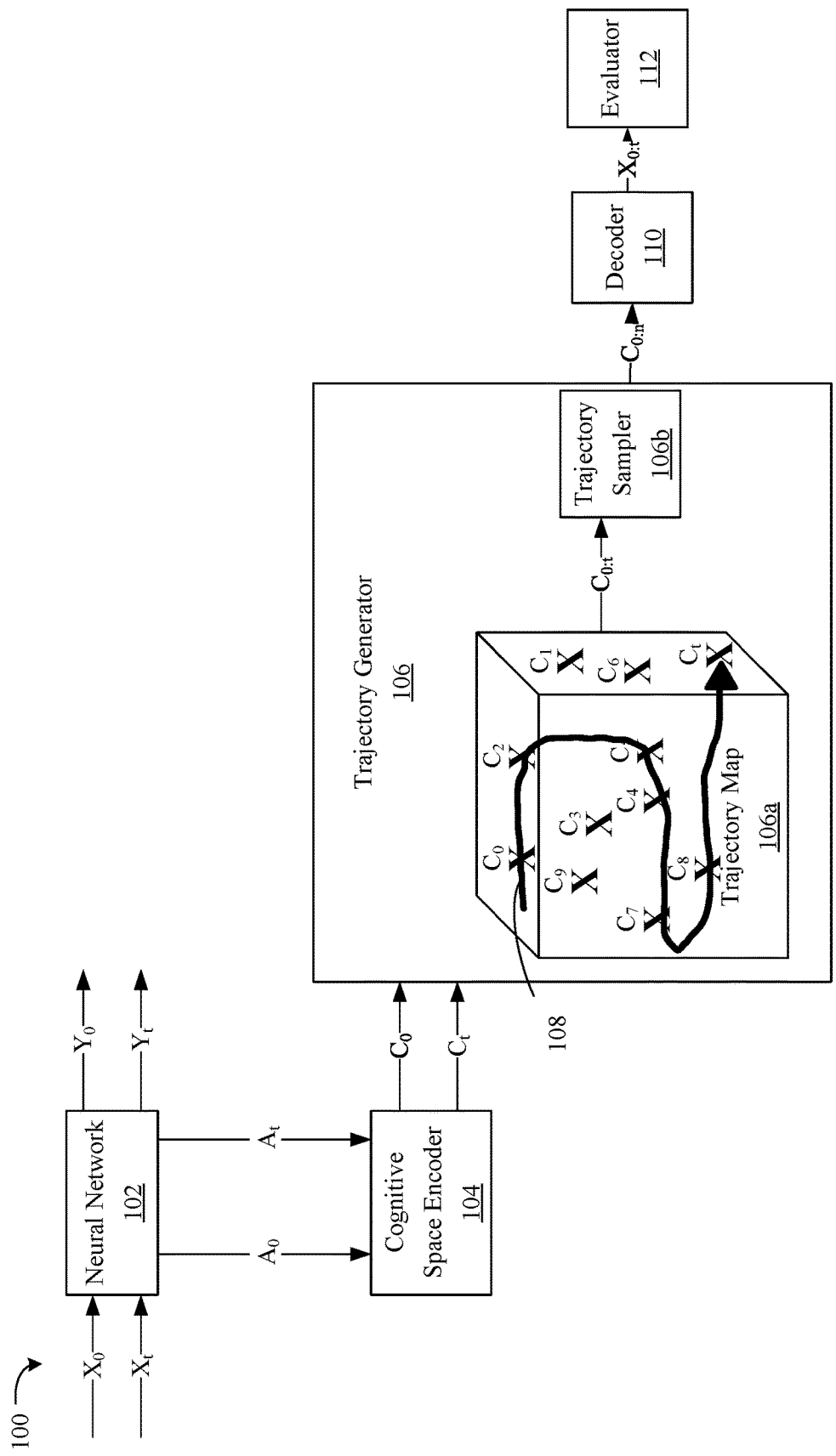
FIG. 1 is a block diagram of an example of a neural network and an evaluation system according to an embodiment.

Turning now to FIG. 1, a computing architecture 100 is shown in which a cognitive space encoder 104, trajectory generator 106, decoder 110 and evaluator 112 may map a neural space of the neural network 102 (e.g., implemented with artificial intelligence and/or machine learning) into a latent space (e.g., a cognitive space), determine trajectories (e.g., cognitive process) through the latent space, and map the trajectories to an input space to evaluate the trajectories for validity. For example, the cognitive space encoder 104, trajectory generator 106, decoder 110 and evaluator 112 may be a neural network evaluation system that learns a compressed representation of how the neural network 102 transforms inputs into outputs. The cognitive space encoder 104 and decoder 110 may be trained based on activations of the neural network 102 and a training set during a training process to identify points in the input space (e.g., a human interpretable space such as images, labels, etc.) that correspond to the cognitive process.

In doing so, the neural network evaluation system may be able to interpret a cognitive process of the neural network 102 in a human readable format (e.g., images, labels or facial features in the input data space) to determine whether the neural network 102 is operating with efficiency. The neural network 102 may be retrained based on whether the neural network 102 is operating with efficiency, resiliency and securely. Thus, the computing architecture 100 may implement functions (e.g., decompose neural functions and trajectories into a human understandable format) that would be difficult if not impossible to manually implement. Moreover, the computing architecture 100 may identify trajectories through the cognitive space to fully understand and comprehend a reasoning process of the neural network 102. Furthermore, the neural network 102 may be enhanced at least to the extent that the neural network 102 may be retrained with specific focuses to strengthen identified inefficiencies or inadequacies.

In more detail, in neural network 102, activations of all the layers that transform inputs $X_0$, $X_t$ into outputs $Y_0$, $Y_t$ may be considered representations of the reasoning process of the neural network 102. The neural network 102 may be parameterized by its weights and biases $\theta$ as $f_\theta(x)$ where x is the input of the neural network 102 and f is the neural network 102. The cognitive space encoder 104 may learn a latent space that represents the cognitive process of the neural network 102 and use the learned latent space (also referred to as a cognitive space) to evaluate how the neural network 102 relates the two different inputs $X_0$ and $X_t$. The cognitive space encoder 104 may receive activations $A_0$, $A_t$ from the neural network 102, and translate the activations $A_0$, $A_t$ into a low dimensional trajectory map 106a (which may be a latent space and/or cognitive space). For example, the cognitive space encoder 104 may modify the activations $A_0$, $A_t$ from a first dimensionality into a second dimensionality that is smaller than the first dimensionality to match the compressed dimensionality of the trajectory map 106a. For example, an activation may be represented as having three dimensions (e.g., (x, y, z)), a function of the cognitive space encoder 104 may project the three dimensions to two dimensions (e.g., (x, y) where the x and y may be modified from original values based on the z value). Thus, in the creation of the trajectory map 106a the cognitive space encoder 104 may include a function to map any point in the first dimension (e.g., (x,y,z) space) to the second dimension (e.g., 2D (x,y) space).

The neural activations $A_0$, $A_t$ may be $\alpha_{f_\theta}(x)$ of the neural network 102 (may also be referred to as $f_\theta$) as the concatenation of all the outputs of every layer in the neural network 102, or a subset of them, depending on the application. The first and second dimensions of the activations $A_0$, $A_t$ and/or modified neural activations $C_0$, $C_t$, may each include inputs, parameters and/or outputs. The cognitive space encoder 104 may output modified activations (e.g., energies) $C_0$, $C_t$, mapped to the trajectory map 106a at a lower dimension relative to a dimension of the activations $A_0$, $A_t$. In some embodiments, the modified activations $C_0$, $C_t$, may carry information about the activations $A_0$, $A_t$ but are not interpretable as such in the space of the trajectory map 106a.

For example, the trajectory map 106a may correspond to the neural space of the neural network 102. The trajectory map 106a may have a lower dimensional space than the neural space. The cognitive space encoder 104 thus compresses input data (e.g., activations $A_0$, $A_t$) that are in the form of the analyzed neural network activations (e.g., $\alpha_{f_\theta}(x) \in R^N$) into a much lower dimensional space $C \in R^M$ (e.g., M is much smaller than N) of the trajectory map 106a to generate $C_0$, $C_t$. The compressed representation embodied in trajectory map 106a may facilitate path/trajectory planning methods to navigate from one point to another.

The cognitive space encoder 104 may output activations $C_0$, $C_t$. The activations $C_0$, $C_t$ may be compressed versions of activations $A_0$, $A_t$ that are mapped to the trajectory map 106a (e.g., the compressed representation of the neural space). In some embodiments, the activations $A_0$, $A_t$ may be a start and end point of a neural analysis (e.g., an initial point and an output point), and $X_0$, $X_t$ may respectively be considered an initial data point (e.g., a facial image) and destination data point (e.g., a user associated with the image) from an input space (e.g., a human interpretable dataset). In some embodiments, intermediate activations (e.g., $A_1$, $A_2$, $A_3$, etc.) between $A_0$ and $A_t$ may be provided to the cognitive space encoder 104 which correspond to activations of the neural network 102 between activation $A_0$ and $A_t$. The cognitive space encoder 104 may similarly map the further activations to the trajectory map 106a.

The trajectory generator 106 may produce trajectories that traverse the trajectory map 106a (e.g., the cognitive space). For example, the trajectory generator 106 may generate trajectory 108 (e.g., a path) from the initial point (e.g., start point corresponding to $C_0$ and based on activation $A_0$) to the end point (e.g., goal point corresponding to $C_t$ based on activation $A_t$). Trajectory 108 in the trajectory map 106a may not be generated in a straight line but may follow a path that connects the initial point $C_0$ to the end point while avoiding obstacles.

In some embodiments, obstacles include unobserved or uncertain regions of the trajectory map 106a or cognitive space. An unobserved or uncertain region of the trajectory map 106a may be a portion that was not properly represented or underrepresented in samples (e.g., under sampled) of a training set to train the cognitive space encoder 104 and the decoder 110. Thus, the trajectory generator 106 may generate trajectories that traverse regions of the trajectory map 106a that are highly sampled (e.g., highly represented in a training data set). The trajectory map 106a may be intentionally more accurate in highly "travelled" regions by construction and through learning. Thus, the output samples, or discrete points $C_o$-$C_n$ (explained further below), may be of high quality and directly related to the behavior of the neural network 102 for accuracy.

For example, the trajectory generator 106 may receive the initial point $C_0$ (e.g., an activation energy) and the end point $C_t$ (e.g., an activation energy). The initial point $C_0$ and the end point $C_t$ may be mapped to the trajectory map 106a. The trajectory generator 106 may then generate a likely path between the initial point $C_0$ and the end point $C_t$ based on path planning algorithms and survival functions based on estimates of densities of points (e.g., activations) in the trajectory map 106a. As noted above, the cognitive space encoder 104 may also map intermediate points (e.g., $C_2$, $C_5$, etc.) to the trajectory map 106a in some embodiments. For example, a non-parametric density estimation may estimate the distribution of the compressed activations in the trajectory map 106a. High-density regions may be favored during trajectory generation, while low-density regions may be avoided. The trajectory generator 106 may then generate the likeliest path through all of the intermediate points and to connect the initial point $C_0$ and the end point $C_t$. The likeliest path will be stored as the trajectory 108.

The trajectory 108 described in the trajectory map 106a to navigate from the initial point $C_0$ to the end point $C_t$ (e.g., the target) may provide an interpretable insight into the validity of the reasoning process of the neural network 102. In order to generate such insights, the trajectory sampler 106b may sample the trajectory 108. For example, the trajectory sampler 106 may sample the discrete points Cost along trajectory 108. For example, the trajectory sampler 106b may sample a set of discrete points along trajectory 108 that correspond to a sequence of points in the input space (e.g. images, facial features, human interpretable data labels). The points may be decoded by the decoder 110 and evaluated by an evaluator 112 so that the coherence of the trajectory 108 may be evaluated. The trajectory 108 may represent a "thought-process" of the neural network 102, and thus the decoded points represent a human-interpretable form of the "thought-process."

The trajectory sampler 106b may sample the trajectory 108 through various processes such as linear processes, log processes, exponential processes, based on curvature processes (e.g., increase samples in regions with high curvature) and so on. As an example, a linear sampling may be used where the trajectory 108 is sampled at N equidistant points in a curve space. In some embodiments, the trajectory sampler 106b may receive each point along the trajectory 108 but provide a subset of discrete points $C_o$-$C_n$ to the decoder 110 for decoding.

The decoder 110 may decode the discrete points $C_o$-$C_n$ into an input space (e.g., a same space as the inputs $X_0$ and $X_t$). For example, the decoder 110 may first decode the points $C_o$-$C_n$ from the cognitive space into the neural space of the neural network 102 (e.g., as a series of activation energies with high dimensionality). The decoded points may be activations of the neural network 102. Such decoded activations may be converted back into the input space by running another process, such as an energy based interpretive decoder. In some embodiments, the decoder 110 may include a cognitive space decoder to decode the discrete points $C_o$-$C_n$ into the input space.

In some embodiments, the decoder 110 may include an energy based generative model (EBM). The EBM may be trained in parallel with the cognitive space encoder 104 during training to build associations with energy levels and inputs in the input space. The EBM may learn to encode input points into low energy scalar values and vice-versa (e.g., energy levels during processing may be similar to the energy levels during training). This mapping from the input space to energy levels may be used to generate points in the input space from energy levels in the neural space. For example, the EBM may correlate energy levels of the decoded points into the input space. The EBM may be used as generative models by finding values at the input space that have low energy values. Thus, the trajectory 108 may be decoded into the input space.

In order to decode the activations into an input point, a random point in the input space may be sampled. This point may be fed forward through the learned EBM and the gradient with respect to the input value is computed. By performing iterated gradient steps over different input values, the random input points may converge to a low energy point that is a point similar to a sample from the training set. In doing so, the EBM may decode a point in the trajectory map 106a (e.g., a latent cognitive space) into the input space. The above process may repeat for each of the sampled points in the trajectory 108.

In some embodiments, in addition to an EBM or alternatively, a statistical regression system (e.g., a neural network, a neural network implemented with artificial intelligence and/or machine learning), may be trained to reconstruct inputs given cognitive space representations of the inputs. In some embodiments, in addition to the above or instead of, a Generative Adversarial Network (GAN) generator may be employed. In such embodiments, a non-parametric density estimator will be used as the distribution of the cognitive space, which may be sampled by the GAN generator to generate new samples.

The decoder 110 may provide the decoded samples $X_{0:t}$, that are mapped into the input space, to an evaluator 112. The evaluator 112 determine a measure of rationality of the trajectory 108. For example, if the number of decoded samples $X_{0:t}$ are not above a threshold, the trajectory 108 may be deemed to be excessively long or inefficient. In some embodiments, if the decoded samples $X_{0:t}$ are unalike from each other, the trajectory 108 may be deemed to be illogical. For example, if for facial recognition, a first of the decoded samples $X_{0:t}$ is corresponds to a face with a beard and eyeglasses, and a second of the decoded samples $X_{0:t}$ corresponds to a face with no beard and eyeglasses, then the trajectory 108 may be deemed illogical and the neural network 102 may be considered prone to error or vulnerable to attack.

Another example may include generating multiple trajectories based on different inputs and/or start and destination points. For example, the evaluator 112 may analyze cognitive trajectories among different views of the same face (e.g. with beard, scarf, glasses, hat, different lighting conditions, etc.) to detect vulnerabilities and correct the vulnerabilities during the validation phase by controlling training of the neural network 102. Thus, in some embodiments, the neural network 102 may implement facial recognition (e.g., to unlock computing features if an authorized user is identified from the facial recognition). The neural network evaluation system described herein may evaluate the neural network 102 for security and retrain the neural network 102 if the neural network 102 does not meet security requirements.

The evaluator 112 may be further control the inputs (e.g., $X_0$, $X_t$) into the neural network 102 based on various parameters and to test for weaknesses or deficiencies in the neural network 102. For example, the evaluator 112 may provide two random inputs from a training dataset. As another example, the evaluator 112 may generate two random points in the trajectory map 106a. Depending on the sparsity of the trajectory map 106a (e.g., the cognitive space) the two random points may be in obstacles and therefore fail to generate a trajectory between the random points. The random selection by the evaluator 112 may provide insights about how the neural network 102 traverses non-densely populated parts of the trajectory map 106a.

In some embodiments, the evaluator 112 may selects two points based on user input in the input space. The evaluator 112 may then provide inputs to the neural network 102 based on the user input.

The evaluator 112 may further generate an adversarial input to quantify a robustness of the neural network 102. For example, the initial point or end point may include known adversarial examples. The different combinations of adversarial-to-known, known-to-adversarial or adversarial-to-adversarial inputs into the neural network 102 may provide different insights about how the trajectory map 106a is formed in corresponding regions (e.g., regions that enhance security by eliminating adversarial inputs). Evaluating the neural network 102 in adversarial regions may provide insight into how the neural network 102 deals with the different types of adversarial attacks and aid in resiliency evaluation and enhancement.

For example, the evaluator 112 may test whether adversarial inputs are within the trajectory map 106a. If adversarial inputs are placed in low-density regions (based on non-parametrically estimated density function). The evaluator 112 may provide an indication that training based on samples in adversarial regions of the trajectory map 106a are necessary to protect the network's responses.

For example, the evaluator 112 may test whether all samples along the trajectory between a sample and an adversarially modified counterpart (e.g., the sample itself with adversarial noise added to it) are located in high density regions. If so, a failure may not be due to lack of samples along the data paths such as the trajectories. Rather, the evaluator 112 may conclude that the neural network 102 and/or a training procedure of the neural network 102 are intrinsically frail to adversarial attacks.

In some embodiments, the evaluator 112 may evaluate a sequence of points along the trajectory path 108 correspond to the input space as images. In the example of images, a sequence of images may be returned. The sequence may be ranked in a certain range (e.g., 0-1 range that may also be referred to as a validation score) for coherence. For example, a sequence from a car image to a plane that travels through car-truck-bus-plane may be ranked as 0.9. If the trajectory was a car-horse-centaur-Pegasus-plane, the trajectory can be ranked as 0.2, since the reasoning is not entirely logical. Finally, if the sequence is car-person-burger-cat-plane the trajectory coherence score can take a value of 0 is completely not logical.

The evaluator 112 may repeat the evaluation process on the neural network 102 a number of times to obtain an aggregated coherency score that may be related to logic and adversarial attack resiliency. In some embodiments, the evaluator 112 may generate several scores (e.g., validation scores) for different initial and end point generation methods (e.g., adversarial, random, etc.).

In some embodiments, the evaluator 112 may evaluate the neural network 102 several times. A ratio of coherent trajectories versus incoherent trajectories may yield an indicator of coherence of the neural network 102 (as ranked above).

In some embodiments, the evaluator 112 may take actionable measures (e.g., retrain) for network correction to mitigate undesirable results. Following the example provided earlier, a user might query the neural network 102 with images of a car and a plane. If the returned trajectory is car-carriage-horse-centaur-Pegasus-plane, this might provide an indication that there is a lack of samples along more expectable trajectories 108, like car-truck-bus-plane for example. The evaluator 112 may subsequently add more samples in these less-observed categories to a training set of the neural network 102 and iterate until the evaluator 112 with the results.

Thus, some embodiments may generate cognitive trajectories to evaluate a reasoning process of the neural network 102. Further, some embodiments may validate the neural network 102 based on the trajectories. Some embodiments may further translate machine readable spaces into interpretable human spaces. Some embodiments may be applied to "mission-critical tasks" in autonomous systems such as industrial robots, autonomous vehicles, service robotics, surveillance systems, etc. Reliable deployment of such systems may be deployed through the validation process described above.

Figure 2:
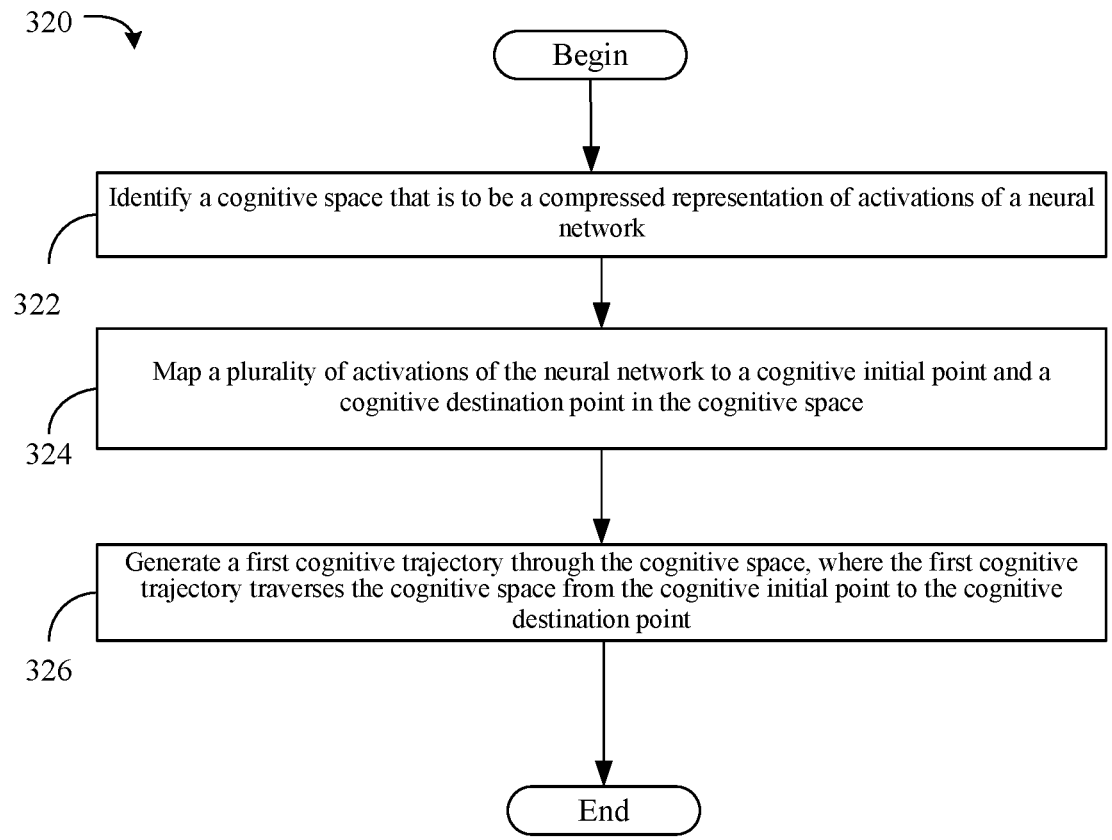
FIG. 2 is a flowchart of an example of a method of generating a cognitive space and identifying resiliency of a neural network according to an embodiment.

FIG. 2 shows a method 320 of generating a cognitive space and identifying resiliency of a neural network. The method 320 may generally be implemented in a neural network evaluation architecture such as, for example, the cognitive space encoder 104, trajectory generator 106, decoder 110 and evaluator 112 (FIG. 1), already discussed. In an embodiment, the method 320 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 320 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 322 identifies a cognitive space that is to be a compressed representation of activations of a neural network. For example, the neural network is associated with a first number of dimensions and the cognitive space is associated with a second number of dimensions, where the second number of dimensions is less than the first number of dimensions. For example, the activations of the neural network may correspond to first number of dimensions and the cognitive space may correspond to the second number of dimensions.

Illustrated processing block 324 maps a plurality of activations of the neural network to a cognitive initial point and a cognitive destination point in the cognitive space. Illustrated processing block 326 generates a first cognitive trajectory through the cognitive space, where the first cognitive trajectory is to traverse the cognitive space from the cognitive initial point to the cognitive destination point.

In some embodiments, the method 320 may further include sampling the first cognitive trajectory to identify one or more intermediate points in the cognitive space, and decoding the one or more intermediate points into an input space to generate input points in the input space. At least one of the plurality of activations is associated with an initial data point from the input space and at least one of the plurality of activations is associated with a destination data point from the input space. The cognitive initial point corresponds to the initial data point and the cognitive destination point corresponds to the destination data point.

In some embodiments, the method 320 includes determining whether to retrain the neural network based on whether a validity score associated with the first cognitive trajectory meets a threshold (e.g., determine whether the reasoning is valid). For example, the method 320 may identify a plurality of trajectories (including the first cognitive trajectory) through the cognitive space and generate a validity score based on a ratio of coherent trajectories from the plurality of trajectories and incoherent trajectories from the plurality of trajectories.

The method 320 may thus generate a cognitive space and generate cognitive trajectories through the cognitive space. The method 320 may generate a validation score (e.g., resiliency score) based on the cognitive trajectories to identify whether to retrain the neural network to enhance functioning of the neural network. For example, the neural network may be retained with a specific focus to strengthen an underperforming portion and/or process of the neural network. Thus, the technology may provide security-enhanced and resiliency-enhanced neural networks. Furthermore, the method 320 may implement a new and enhanced neural network analysis to identify a cognitive process (which may otherwise be opaque and unknown to most systems and/or developers) of the neural network through cognitive trajectory maps and trajectories.

Figure 3A:
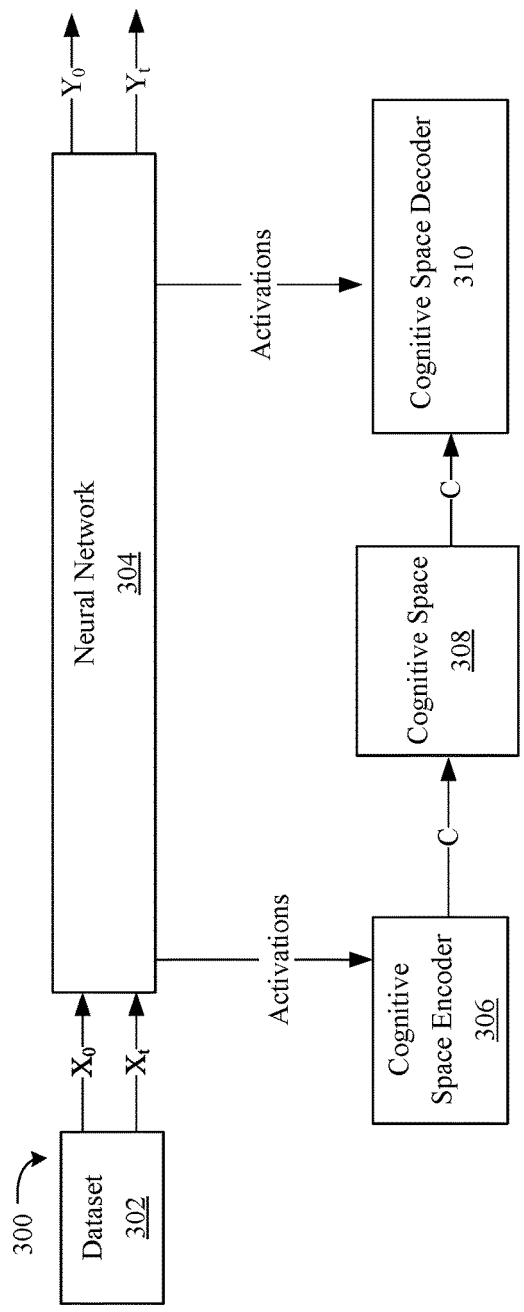
FIGS. 3A-3B are training processes of examples of training a cognitive space encoder and decoder according to an embodiment.
Figure 3B:
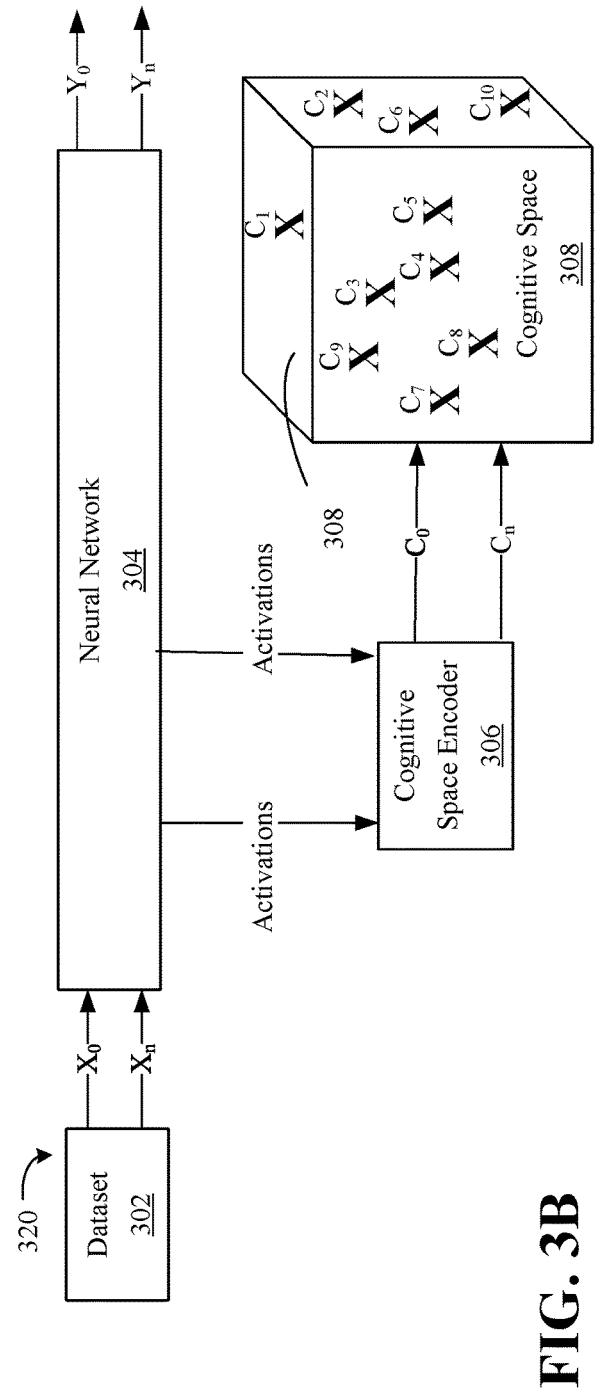

FIGS. 3A and 3B show a two-pass training process 300, 320 to train a cognitive space encoder 306. Additionally, a cognitive space decoder 310 may be trained in process 300.

Process 300 shows pre-processing based on activations from the neural network 304. The cognitive space encoder $g_{e\psi}(\alpha)$ 306 may be trained to learn a low dimensional representation of the neural activations $\alpha_{(f\theta)}(x)$ of the neural network 304.

For example, the cognitive space encoder 306 may be trained based on dataset 302 (e.g., input data in an input space) that causes activations in the neural network 304. For example, the neural network 304 may analyze inputs $X_0$, $X_t$ from dataset 302 to generate the activations of the neural network 304. The cognitive space encoder 306 may reduce a dimension of a neural network 304 space (e.g., $\alpha_{(f\_\theta)}(x) \in R^N$) of the activations into a lower dimensional space $C \in R^M$ (e.g., M may be significantly smaller than N).

The cognitive space encoder 306 may be trained with the activations that are a result of performing a forward pass of the dataset 302 through the neural network 304. It is worthwhile to note that depending on the application, different dimensionality reduction techniques can be selectively applied. For example, Principal Component Analysis (PCA), Random Forests and the different types of autoencoders (e.g. convolutional, multilayer, regularized, etc.) may be employed. In some embodiments, the dimensions may be selected in a way to satisfy one or more constraints (e.g., metric properties). For example, the one or more constraints may be based on distances. For example, two points close in the input space may similarly need to be close in the encoded space (e.g., the distance between the two points in the input and encoded space are similar).

Process 300 may concurrently (e.g., in parallel) train cognitive space decoder 310 based on the activations. The cognitive space decoder 310 may be trained to decode input points into low energy scalar values. The mapping from the input space to an energy level, may be used to generate points in the input space that have low energy, and are similar to the input values shown to the cognitive space decoder 310 during training.

FIG. 3B shows process 320 to build a set of observed points $C_1$-$C_{10}$. For example, once the cognitive space encoder 306 learns the mapping from activations to the low dimensional space, a second pass 320 on the dataset 302 may build a set of observed points $C_1$-$C_{10}$ in the cognitive space 308. The low dimensional representation of network activations induced by the dataset 302 may be used together as a set of observed points $C_1$-$C_{10}$ in the cognitive space 308. The set of observed points $C_1$-$C_{10}$ may correspond to anchors in the cognitive space 308 that may be decoded into corresponding real-world identifications (e.g., images, facial recognition, etc.). These observed points $C_1$-$C_{10}$ may guide the trajectory generation through regions of the cognitive space 308 that have been observed in the dataset 302 and avoid traversing regions of the cognitive space 308 that are uncertain or unexplored. For example, a non-parametric density estimation technique may be is used to estimate the distribution of the compressed activations in the cognitive space 308. High-density regions may be favored during trajectory generation, while low-density regions will be avoided.

Once the cognitive space encoder 306 is trained, the cognitive space encoder 306 may map activations of the neural network 304 into the cognitive space 308. The cognitive space encoder 306 may populate the cognitive space 308 with the activations.

Figure 4:
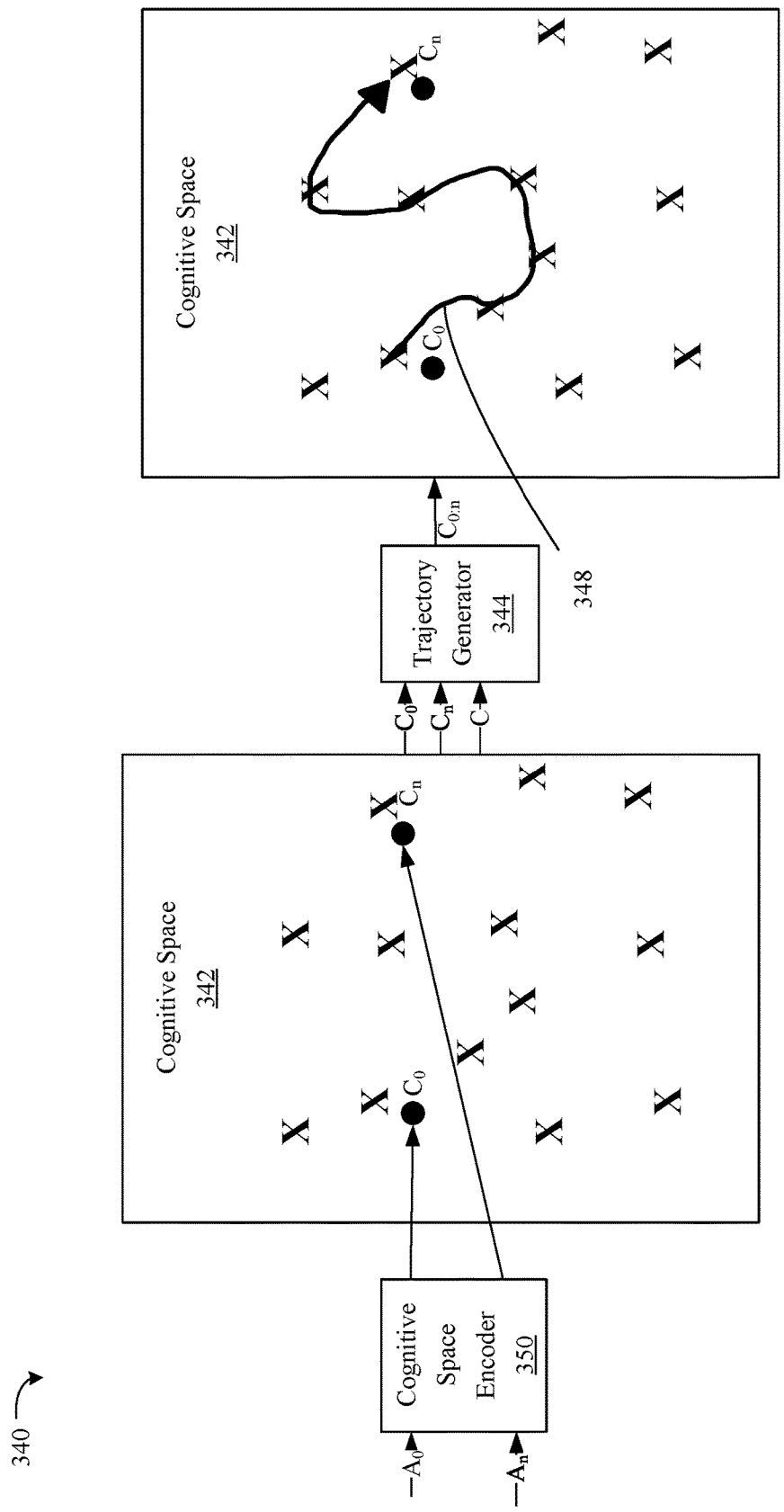
FIG. 4 is a process of examples of generating a cognitive path according to an embodiment.

FIG. 4 shows a cognitive path generation process 340 to generate a trajectory 348 that traverse a cognitive space 342 from an initial point $C_0$ to a destination point $C_n$. The trajectory 348 in the cognitive space 342 may not be a straight line but may follow a path that connects the initial point $C_0$ to the destination point $C_n$ while avoiding obstacles (e.g., unseen, uncertain or unobserved regions).

As noted above, a non-parametric density estimation technique may be used to estimate a distribution of the compressed activations in the cognitive space. The trajectory generator 344 may favor high-density regions during trajectory generation, while low-density regions may be avoided. For example, the trajectory generator 344 may use a survival function of the estimated density (e.g., its tail) as the likelihood of each point in the cognitive space 342 to contain an obstacle. The trajectory generator 344 may implement path planning algorithms (e.g. RRT, PRM, A*) to trace a path from the initial point $C_0$ to the destination point $C_n$ while avoiding regions of the space that may not be represented in the training data.

Thus, the trajectory 348 is a continuous path from the initial point $C_0$ to a destination point $C_n$. The trajectory generator 344 generates trajectories that traverse regions of the cognitive space 342 that are highly sampled during training of the cognitive space encoder 350. The cognitive space 342 will be, by construction and learning, more accurate in these regions. Thus, the samples will be of high quality and directably relatable to a neural network's behavior.

Figure 5:
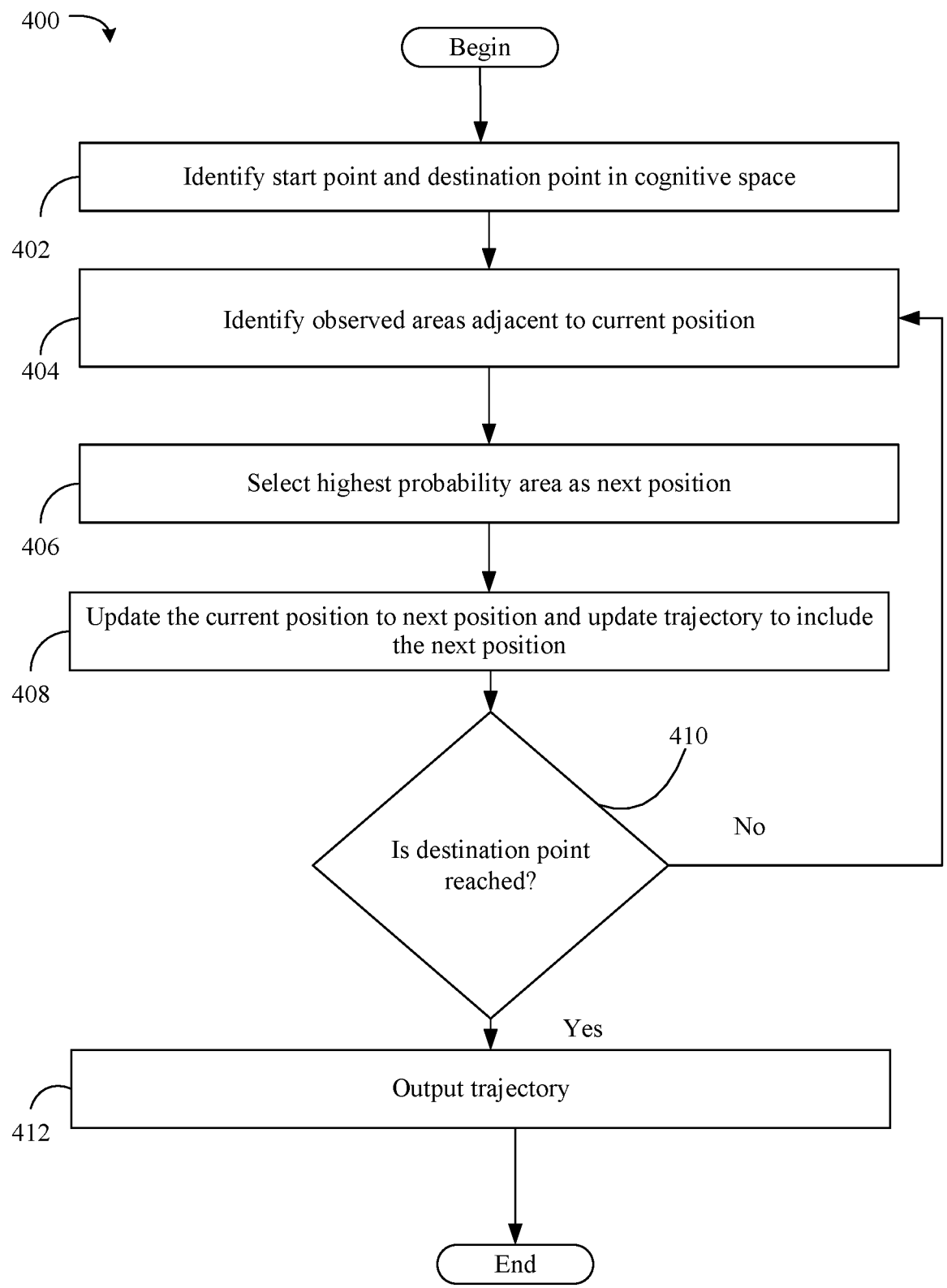
FIG. 5 is a flowchart of an example of a method of generating a trajectory through a cognitive space according to an embodiment.

FIG. 5 shows a method 400 of generating a trajectory through a cognitive space. The method 400 may be readily implemented with the evaluation system (FIG. 1), the method 320 (FIG. 2), the cognitive space encoder 350 and trajectory generator 344 (FIG. 4), already discussed. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 identifies a start point and a destination point in cognitive space (e.g., based on activations from a neural network). Illustrated processing block 404 identifies observed areas adjacent to a current position. The current position presently corresponds to the start point. Illustrated processing block 406 selects a highest probability area as a next position in the trajectory. The highest probability area may be an area that has a greatest probability of leading to the destination point. For example, a position may be selected based on whether a path towards the destination node is available from the position (e.g., the position is not a "dead end"), and avoid positions that do not have available paths to the destination point. As noted above, density of samples may also be considered when determining the next position.

In some embodiments, processing block 406 may modify operation based on a type of path planning analysis. Some path planning analysis may execute iteratively but may not be "anytime" (meaning the output is generated at once, when the algorithm finishes its processing). Some planning algorithms (e.g., A* search algorithm) may find an optimal (e.g., shortest) path if such a path exists. In some embodiments, Probabilistic Roadmap (PRM) methods may be used instead to execute more effectively in higher dimensionality spaces.

Illustrated processing block 408 updates the current position to the next position and updates the trajectory to include the next position. Illustrated processing block 410 identifies whether the destination point is reached. For example, if the current position is the same as the destination position then the destination position may have been reached, and illustrated processing block 412 outputs the trajectory. Otherwise, illustrated processing block 404 may execute.

Figure 6:
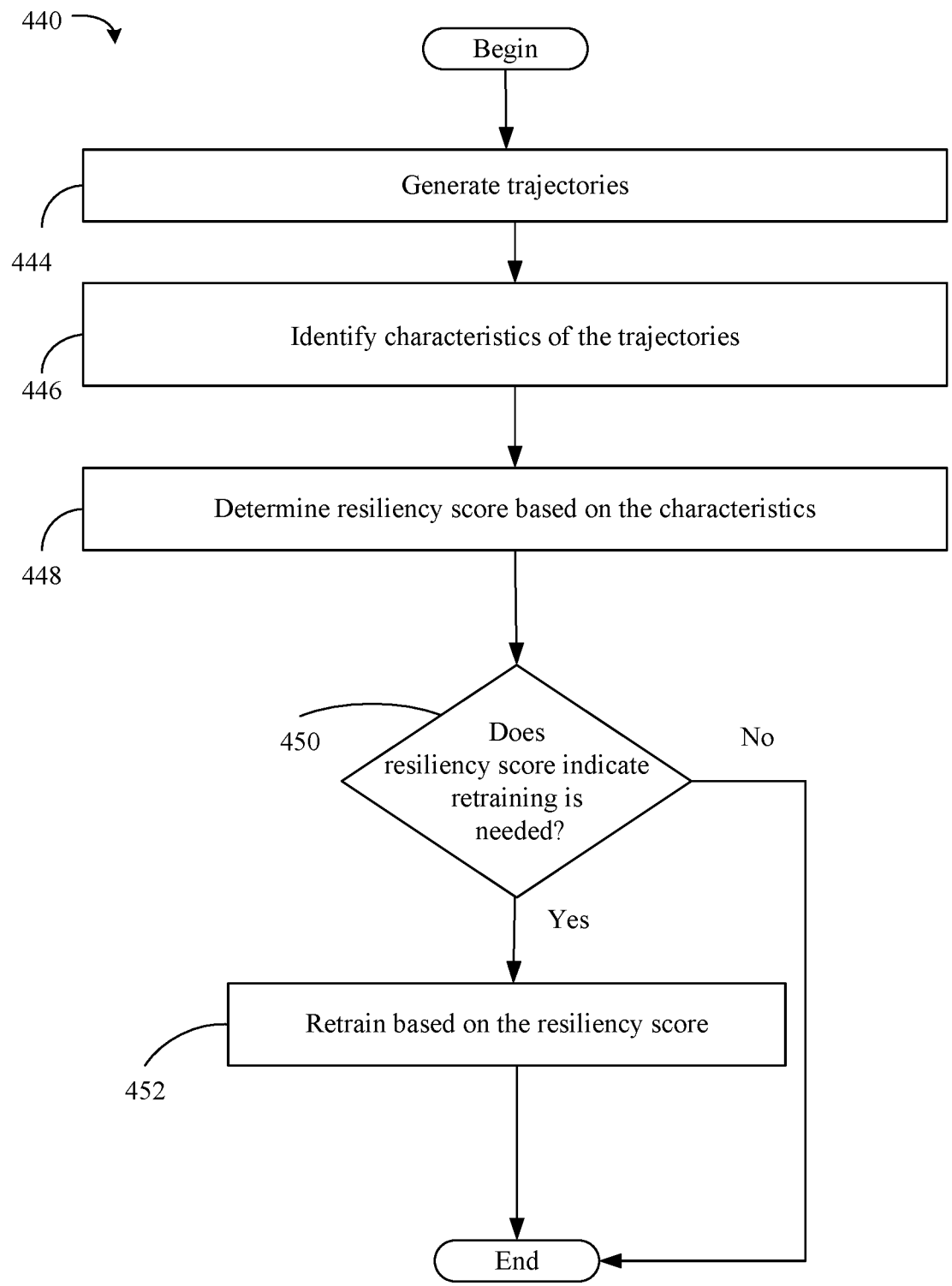
FIG. 6 is a flowchart of an example of a method of determining a resiliency score according to an embodiment.

FIG. 6 shows a method 440 of determining a resiliency score (e.g., a validation score) of a neural network and retraining based on the resiliency score. The method 440 may be readily implemented with the evaluation system (FIG. 1), the method 320 (FIG. 2), the two-pass training process 300, 320 (FIGS. 3A-3B), the cognitive space encoder 350 and trajectory generator 344 (FIG. 4), the method 400 (FIG. 5) already discussed. More particularly, the method 440 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 444 generates trajectories through a cognitive space associated with the neural network. Illustrated processing block 446 identifies characteristics of the trajectories. For example, the characteristics may include identifying whether the trajectory includes similar or dissimilar intermediate points (e.g., whether images are similar to each other). Some embodiments may include identifying whether adversarial inputs for facial recognition are properly identified and whether the intermediate points indicate that the neural network properly processed the adversarial input.

Illustrated processing block 448 determines a resiliency score based on the characteristics. Illustrated processing block 450 determines whether the resiliency score indicates that retraining is needed (e.g., retraining may be needed if the resiliency score is below a threshold). If not, the method 440 may end. Otherwise, illustrated processing block 452 retrains the neural network based on the resiliency score.

In some embodiments, the characteristics may indicate that a particular portion and/or process of the neural network underperforms (e.g., adversarial inputs are not properly identified and "fool" the system, unobserved portions of the neural network lead to poor trajectories and should be remedied by retraining to include more samples from the unobserved portions). In such embodiments, the retraining may execute with a specific focus to the underperforming portions of the neural network. For example, samples from unobserved portions may be provided to the neural network to mitigate adversarial attacks.

Figure 7:
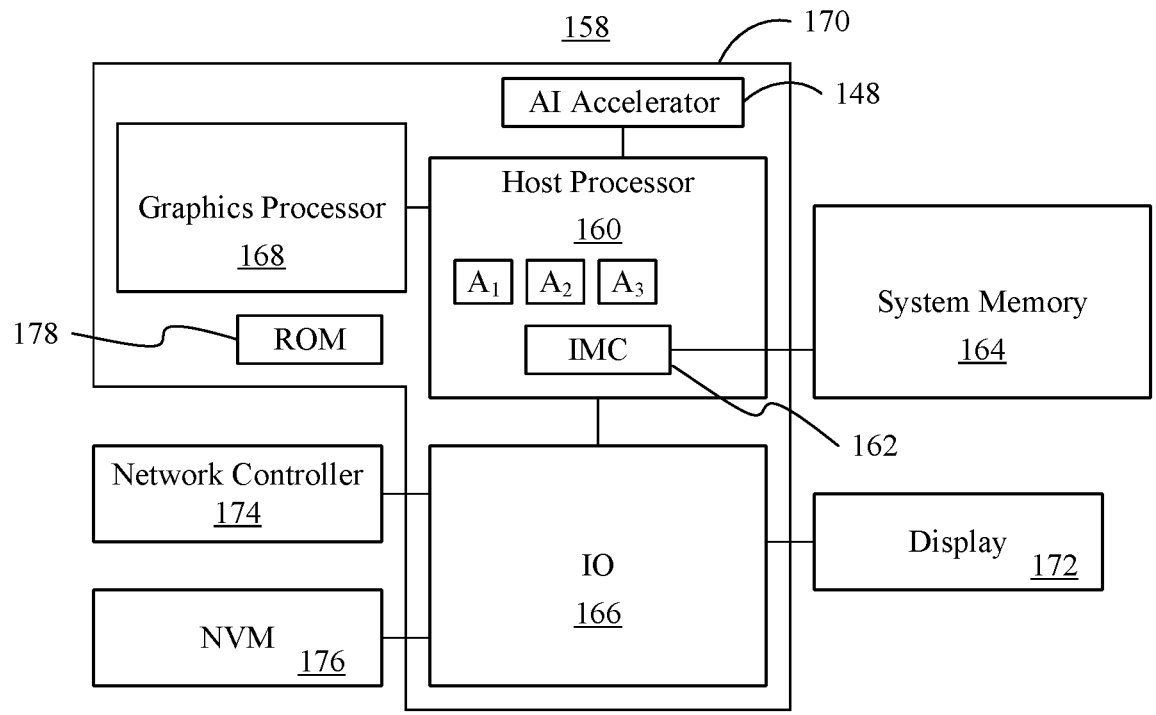
FIG. 7 is a block diagram of an example of a computing system according to an embodiment.

Turning now to FIG. 7, a resiliency-enhanced computing system 158 (e.g., a computing device) is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164. The host processor 160 further includes accelerators $A_1$-$A_3$ (although any number of accelerators may be provided) to implement a neural network. In some embodiments, the system 158 may further communicate with other electronic devices that also implement the neural network. For example, the system 158 may synchronize with the other electronic devices by exchanging weights, biases and data with the other electronic devices.

The illustrated system 158 also includes a graphics processor 168 (e.g., graphics processing unit/GPU) and an input output (IO) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other NVM). The illustrated SOC 170 includes a ROM 178 with logic instructions, which when executed by the accelerators $A_1$-$A_3$, host processor 160 or graphics processor 160, cause the computing system 158 to implement and/or perform one or more aspects of the evaluation system (FIG. 1), the method 320 (FIG. 2), the two-pass training process 300, 320 (FIGS. 3A-3B), the cognitive space encoder 350 and trajectory generator 344 (FIG. 4), the method 400 (FIG. 5), and/or method 440 (FIG. 6), already discussed.

In some embodiments, the system 158 may further include processors (not shown) and/or an AI accelerator 148 that is dedicated to artificial intelligence (AI) and/or neural network (NN) processing. For example, the system SoC 170 may include vision processing units (VPUs, not shown) and/or other AI/NN-specific processors such as the AI accelerator 148, etc. In some embodiments, any aspect of the embodiments described herein may be implemented in the processors and/or accelerators dedicated to AI and/or NN processing such as AI accelerator 148, the graphics processor 168 and/or the host processor 160.

Thus, the illustrated system 158 may identify a cognitive space that is to be a compressed representation of activations of a neural network, map a plurality of activations of the neural network to a cognitive initial point and a cognitive destination point in the cognitive space and generate a first cognitive trajectory through the cognitive space, wherein the first cognitive trajectory maps the cognitive initial point to the cognitive destination point. The system 158 may generate a validation score (e.g., resiliency score) based on the first cognitive trajectory to identify whether to retrain the neural network, and whether the neural network should be retained with a specific focus to strengthen an underperforming portion and/or process of the neural network. Thus, the system 158 may provide security-enhanced and resiliency-enhanced neural networks. Furthermore, the system 158 may implement a new and enhanced neural network analysis to identify a "thought-process" of the neural network through cognitive trajectory maps and trajectories. In some embodiments, the validation score may be presented on the display 172 so a user may view the validation score. In some embodiments, the system 150 may cause the electronic devices to also retrain based on the analysis conducted by the system 150. For example, the system 150 may transmit a message to the electronic devices through the network controller 174 to instruct the electronic devices to retrain.

Figure 8:
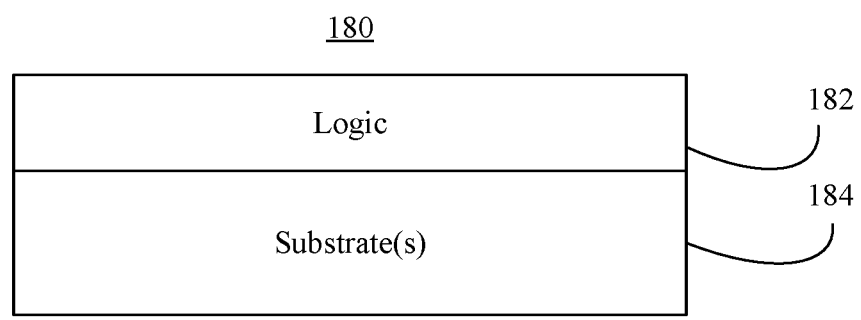
FIG. 8 is an illustration of an example of a semiconductor apparatus according to an embodiment.

FIG. 8 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement and/or perform one or more aspects of the evaluation system (FIG. 1), the method 320 (FIG. 2), the two-pass training process 300, 320 (FIGS. 3A-3B), the cognitive space encoder 350 and trajectory generator 344 (FIG. 4), the method 400 (FIG. 5), and/or method 440 (FIG. 6), already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

In some embodiments, the logic 182 may further include processors (not shown) and/or accelerators (not shown) dedicated to AI and/or NN processing. For example, the logic 182 may include VPUs, and/or other AI/NN-specific processors, etc. In some embodiments, any aspect of the embodiments described herein may be implemented in the processors and/or accelerators dedicated to AI and/or NN processing.

Figure 9:
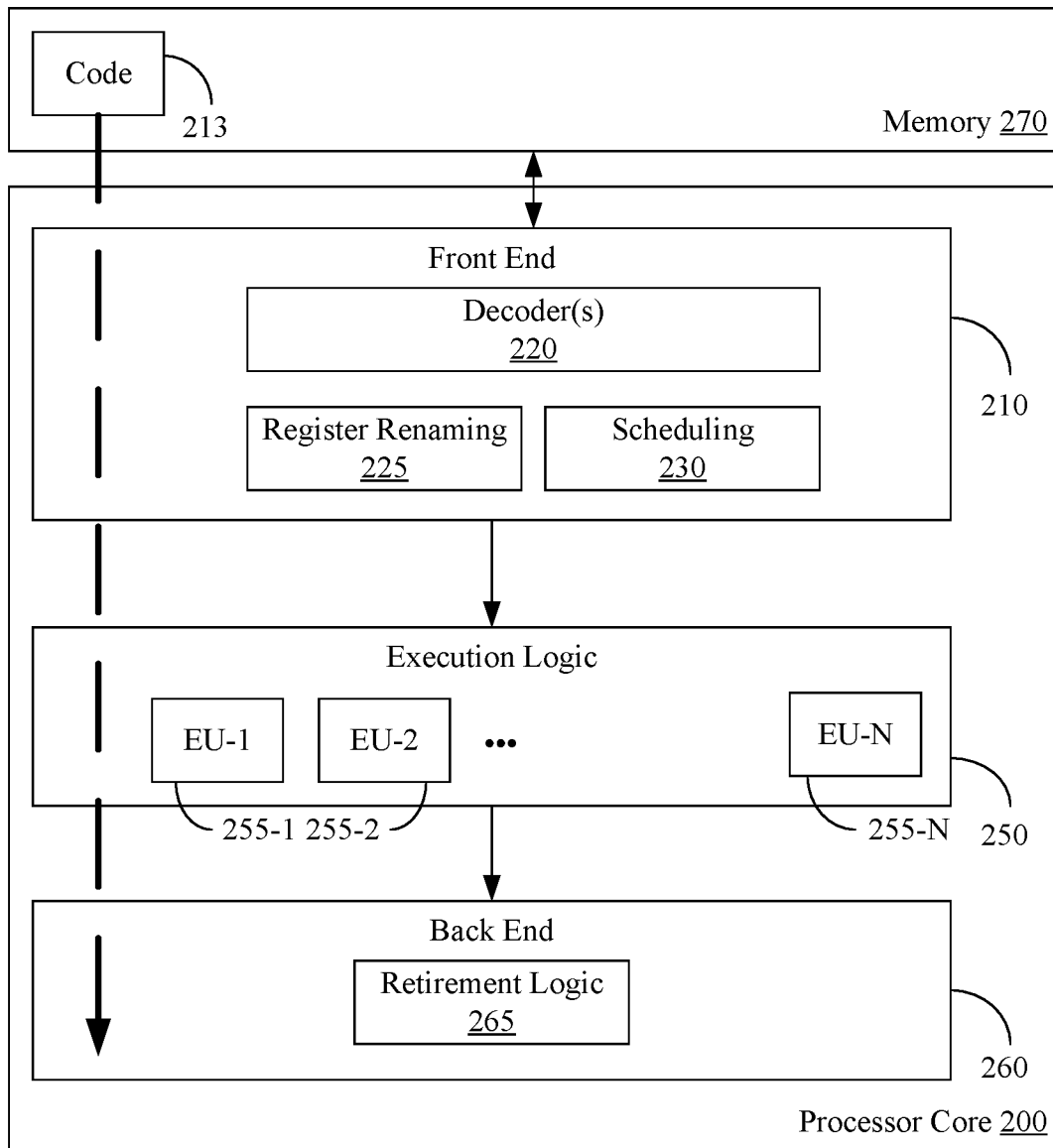
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement and/or perform one or more aspects of the evaluation system (FIG. 1), the method 320 (FIG. 2), the two-pass training process 300, 320 (FIGS. 3A-3B), the cognitive space encoder 350 and trajectory generator 344 (FIG. 4), the method 400 (FIG. 5), and/or method 440 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
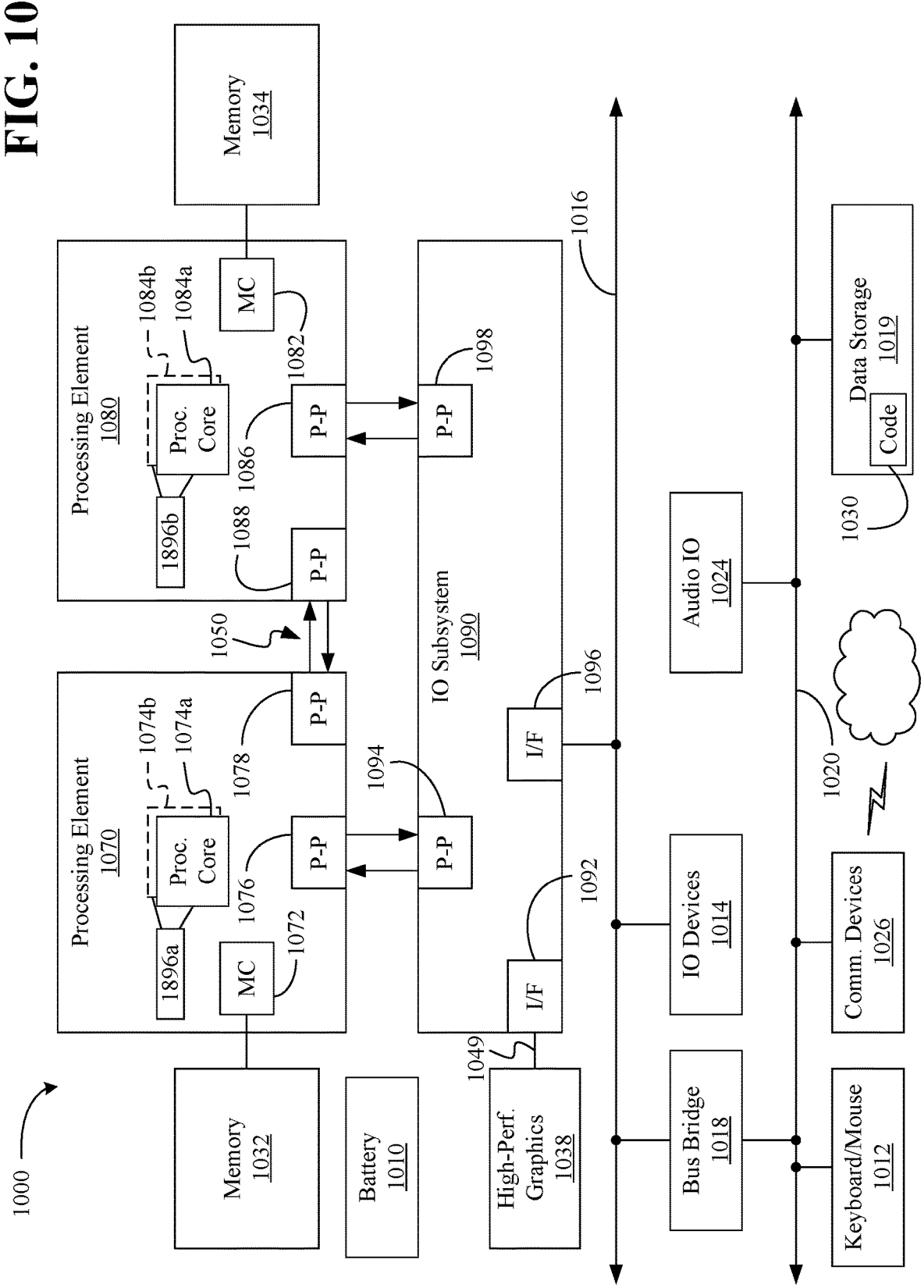
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement and/or perform one or more aspects of the evaluation system (FIG. 1), the method 320 (FIG. 2), the two-pass training process 300, 320 (FIGS. 3A-3B), the cognitive space encoder 350 and trajectory generator 344 (FIG. 4), the method 400 (FIG. 5), and/or method 440 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a computing device comprising a network controller to communicate with one or more electronic devices that are to implement a neural network, a graphics processor, a central processing unit, and a memory including a set of instructions, which when executed by one or more of the graphics processor or the central processing unit, cause the computing device to identify a cognitive space that is to be a compressed representation of activations of the neural network, map a plurality of activations of the neural network to a cognitive initial point and a cognitive destination point in the cognitive space and generate a first cognitive trajectory through the cognitive space, wherein the first cognitive trajectory is to traverse the cognitive space from the cognitive initial point to the cognitive destination point.

Example 2 includes the computing device of example 1, wherein the instructions, when executed, cause the computing device to determine whether to retrain the neural network based on whether a validity score associated with the first cognitive trajectory meets a threshold.

Example 3 includes the computing device of example 1, wherein the instructions, when executed, cause the computing device to sample the first cognitive trajectory to identify one or more intermediate points in the cognitive space, and decode the one or more intermediate points into an input space to generate input points in the input space.

Example 4 includes the computing device of example 3, wherein at least one of the plurality of activations is to be associated with an initial data point from the input space, at least one of the plurality of activations is to be associated with a destination data point from the input space, and the cognitive initial point is to correspond to the initial data point and the cognitive destination point is to correspond to the destination data point.

Example 5 includes the computing device of example 1, wherein the instructions, when executed, cause the computing device to identify a plurality of trajectories through the cognitive space, and generate a validity score based on a ratio of coherent trajectories from the plurality of trajectories and incoherent trajectories from the plurality of trajectories.

Example 6 includes the computing device of example 1, wherein the neural network is to be associated with a first number of dimensions and the cognitive space is to be associated with a second number of dimensions, wherein the second number of dimensions is to be less than the first number of dimensions.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to identify a cognitive space that is to be a compressed representation of activations of a neural network, map a plurality of activations of the neural network to a cognitive initial point and a cognitive destination point in the cognitive space, and generate a first cognitive trajectory through the cognitive space, wherein the first cognitive trajectory is to traverse the cognitive space from the cognitive initial point to the cognitive destination point.

Example 8 includes the apparatus of example 7, wherein the logic coupled to the one or more substrates is to determine whether to retrain the neural network based on whether a validity score associated with the first cognitive trajectory meets a threshold.

Example 9 includes the apparatus of example 7, wherein the logic coupled to the one or more substrates is to sample the first cognitive trajectory to identify one or more intermediate points in the cognitive space, and decode the one or more intermediate points into an input space to generate input points in the input space.

Example 10 includes the apparatus of example 9, wherein at least one of the plurality of activations is to be associated with an initial data point from the input space, at least one of the plurality of activations is to be associated with a destination data point from the input space, and the cognitive initial point is to correspond to the initial data point and the cognitive destination point is to correspond to the destination data point.

Example 11 includes the apparatus of example 7, wherein the logic is to identify a plurality of trajectories through the cognitive space, and generate a validity score based on a ratio of coherent trajectories from the plurality of trajectories and incoherent trajectories from the plurality of trajectories.

Example 12 includes the apparatus of example 7, wherein the neural network is to be associated with a first number of dimensions and the cognitive space is to be associated with a second number of dimensions, wherein the second number of dimensions is to be less than the first number of dimensions.

Example 13 includes the apparatus of example 7, wherein the logic coupled to the one or more substrates includes transistor channel regions that are positioned within the one or more substrates.

Example 14 includes at least one computer readable storage medium comprising a set of instructions, which when executed by a computing device, cause the computing device to identify a cognitive space that is to be a compressed representation of activations of a neural network, map a plurality of activations of the neural network to a cognitive initial point and a cognitive destination point in the cognitive space, and generate a first cognitive trajectory through the cognitive space, wherein the first cognitive trajectory is to traverse the cognitive space from the cognitive initial point to the cognitive destination point.

Example 15 includes the at least one computer readable storage medium of example 14, wherein the instructions, when executed, cause the computing device to determine whether to retrain the neural network based on a whether validity score associated with the first cognitive trajectory meets a threshold.

Example 16 includes the at least one computer readable storage medium of example 14, wherein the instructions, when executed, cause the computing device to sample the first cognitive trajectory to identify one or more intermediate points in the cognitive space, and decode the one or more intermediate points into an input space to generate input points in the input space.

Example 17 includes the at least one computer readable storage medium of example 16, wherein at least one of the plurality of activations is to be associated with an initial data point from the input space, at least one of the plurality of activations is to be associated with a destination data point from the input space, and the cognitive initial point is to correspond to the initial data point and the cognitive destination point is to correspond to the destination data point.

Example 18 includes the at least one computer readable storage medium of example 14, wherein the instructions, when executed, cause the computing device to identify a plurality of trajectories through the cognitive space, and generate a validity score based on a ratio of coherent trajectories from the plurality of trajectories and incoherent trajectories from the plurality of trajectories.

Example 19 includes the at least one computer readable storage medium of example 14, wherein the neural network is to be associated with a first number of dimensions and the cognitive space is to be associated with a second number of dimensions, wherein the second number of dimensions is to be less than the first number of dimensions.

Example 20 includes a method comprising identifying a cognitive space that is to be a compressed representation of activations of a neural network, mapping a plurality of activations of the neural network to a cognitive initial point and a cognitive destination point in the cognitive space, and generating a first cognitive trajectory through the cognitive space, wherein the first cognitive trajectory traverses the cognitive space from the cognitive initial point to the cognitive destination point.

Example 21 includes the method of example 20, further including determining whether to retrain the neural network based on whether a validity score associated with the first cognitive trajectory meets a threshold.

Example 22 includes the method of example 20, further including sampling the first cognitive trajectory to identify one or more intermediate points in the cognitive space, and decoding the one or more intermediate points into an input space to generate input points in the input space.

Example 23 includes the method of example 22, wherein at least one of the plurality of activations is to be associated with an initial data point from the input space, at least one of the plurality of activations is to be associated with a destination data point from the input space, and the cognitive initial point is to correspond to the initial data point and the cognitive destination point is to correspond to the destination data point.

Example 24 includes the method of example 20, further including identifying a plurality of trajectories through the cognitive space, and generating a validity score based on a ratio of coherent trajectories from the plurality of trajectories and incoherent trajectories from the plurality of trajectories.

Example 25 includes the method of example 20, wherein the neural network is to be associated with a first number of dimensions and the cognitive space is to be associated with a second number of dimensions, wherein the second number of dimensions is less than the first number of dimensions.

Example 26 includes a semiconductor apparatus comprising means for identifying a cognitive space that is to be a compressed representation of activations of a neural network, means for mapping a plurality of activations of the neural network to a cognitive initial point and a cognitive destination point in the cognitive space, and means for generating a first cognitive trajectory through the cognitive space, wherein the first cognitive trajectory traverses the cognitive space from the cognitive initial point to the cognitive destination point.

Example 27 includes the apparatus of example 20, further including means for determining whether to retrain the neural network based on whether a validity score associated with the first cognitive trajectory meets a threshold.

Example 28 includes the apparatus of example 20, further including means for sampling the first cognitive trajectory to identify one or more intermediate points in the cognitive space, and means for decoding the one or more intermediate points into an input space to generate input points in the input space.

Example 29 includes the apparatus of example 28, wherein at least one of the plurality of activations is to be associated with an initial data point from the input space, at least one of the plurality of activations is to be associated with a destination data point from the input space, and the cognitive initial point is to correspond to the initial data point and the cognitive destination point is to correspond to the destination data point.

Example 30 includes the apparatus of example 26, further including means for identifying a plurality of trajectories through the cognitive space, and means for generating a validity score based on a ratio of coherent trajectories from the plurality of trajectories and incoherent trajectories from the plurality of trajectories.

Example 31 includes the apparatus of any of examples 26-30, wherein the neural network is to be associated with a first number of dimensions and the cognitive space is to be associated with a second number of dimensions, wherein the second number of dimensions is less than the first number of dimensions.

Thus, technology described herein may generate a cognitive space and generate cognitive trajectories through the cognitive space. The system may generate a validation score (e.g., resiliency score) based on the cognitive trajectories to identify whether to retrain the neural network to enhance functioning of the neural network. For example, the neural network may be retained with a specific focus to strengthen an underperforming portion and/or process of the neural network. Thus, the technology may provide security-enhanced and resiliency-enhanced neural networks. Furthermore, the technology may implement a new and enhanced neural network analysis to identify a cognitive process (which may otherwise be opaque and unknown to most systems and/or developers) of the neural network through cognitive trajectory maps and trajectories.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing device comprising:
a network controller to communicate with one or more electronic devices that are to implement a neural network;
a graphics processor;
a central processing unit; and
a memory including a set of instructions, which when executed by one or more of the graphics processor or the central processing unit, cause the computing device to:
identify a cognitive space that is to be a compressed representation of training activations of the neural network;
execute, with the neural network, a process to generate an output based on an input, wherein the neural network is to generate a plurality of activations as part of the process, and wherein the plurality of activations has a first number of dimensions;
reduce the first number of dimensions of the plurality of activations to a second number of dimensions to obtain adjusted activations;
map the adjusted activations of the neural network to a cognitive initial point and a cognitive destination point in the cognitive space; and
generate a first cognitive trajectory through the cognitive space, wherein the first cognitive trajectory is to traverse the cognitive space from the cognitive initial point to the cognitive destination point.

2. The computing device of claim 1, wherein the instructions, when executed, cause the computing device to:
determine whether to retrain the neural network based on whether a validity score associated with the first cognitive trajectory meets a threshold.

3. The computing device of claim 1, wherein the instructions, when executed, cause the computing device to:
sample the first cognitive trajectory to identify one or more intermediate points in the cognitive space; and
decode the one or more intermediate points into an input space to generate input points in the input space.

4. The computing device of claim 3, wherein:
at least one of the adjusted activations is to be associated with an initial data point from the input space;
at least one of the adjusted activations is to be associated with a destination data point from the input space; and
the cognitive initial point is to correspond to the initial data point and the cognitive destination point is to correspond to the destination data point.

5. The computing device of claim 1, wherein the instructions, when executed, cause the computing device to:
identify a plurality of trajectories through the cognitive space;
identify coherent trajectories of the plurality of trajectories based on a logical sequences of points of the coherent trajectories being identified as being similar to each other;
identify incoherent trajectories of the plurality of trajectories based on an illogical sequence of points of the incoherent trajectories being dissimilar to each other; and
generate a validity score based on a ratio of the coherent trajectories and the incoherent trajectories.

6. The computing device of claim 1, wherein the neural network is to be associated with the first number of dimensions and the cognitive space is to be associated with the second number of dimensions, wherein the second number of dimensions is to be less than the first number of dimensions.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
identify a cognitive space that is to be a compressed representation of training activations of a neural network;
execute, with the neural network, a process to generate an output based on an input, wherein the neural network is to generate a plurality of activations as part of the process, and wherein the plurality of activations has a first number of dimensions;

reduce the first number of dimensions of the plurality of activations to a second number of dimensions to obtain adjusted activations;

map the adjusted activations of the neural network to a cognitive initial point and a cognitive destination point in the cognitive space; and generate a first cognitive trajectory through the cognitive space, wherein the first cognitive trajectory is to traverse the cognitive space from the cognitive initial point to the cognitive destination point.

8. The apparatus of claim 7, wherein the logic coupled to the one or more substrates is to:

determine whether to retrain the neural network based on whether a validity score associated with the first cognitive trajectory meets a threshold.

9. The apparatus of claim 7, wherein the logic coupled to the one or more substrates is to:

sample the first cognitive trajectory to identify one or more intermediate points in the cognitive space; and decode the one or more intermediate points into an input space to generate input points in the input space.

10. The apparatus of claim 9, wherein:

at least one of the adjusted activations is to be associated with an initial data point from the input space;

at least one of the adjusted activations is to be associated with a destination data point from the input space; and the cognitive initial point is to correspond to the initial data point and the cognitive destination point is to correspond to the destination data point.

11. The apparatus of claim 7, wherein the logic is to:

identify a plurality of trajectories through the cognitive space;

identify coherent trajectories of the plurality of trajectories based on a logical sequences of points of the coherent trajectories being identified as being similar to each other;

identify incoherent trajectories of the plurality of trajectories based on an illogical sequence of points of the incoherent trajectories being dissimilar to each other; and generate a validity score based on a ratio of the coherent trajectories and the incoherent trajectories.

12. The apparatus of claim 7, wherein the neural network is to be associated with the first number of dimensions and the cognitive space is to be associated with the second number of dimensions, wherein the second number of dimensions is to be less than the first number of dimensions.

13. The apparatus of claim 7, wherein the logic coupled to the one or more substrates includes transistor channel regions that are positioned within the one or more substrates.

14. At least one non-transitory computer readable storage medium comprising a set of instructions, which when executed by a computing device, cause the computing device to:

identify a cognitive space that is to be a compressed representation of training activations of a neural network;

execute, with the neural network, a process to generate an output based on an input, wherein the neural network is to generate a plurality of activations as part of the process, and wherein the plurality of activations has a first number of dimensions;

reduce the first number of dimensions of the plurality of activations to a second number of dimensions to obtain adjusted activations;

map the adjusted activations of the neural network to a cognitive initial point and a cognitive destination point in the cognitive space; and generate a first cognitive trajectory through the cognitive space, wherein the first cognitive trajectory is to traverse the cognitive space from the cognitive initial point to the cognitive destination point.

15. The at least one non-transitory computer readable storage medium of claim 14, wherein the instructions, when executed, cause the computing device to:

determine whether to retrain the neural network based on whether a validity score associated with the first cognitive trajectory meets a threshold.

16. The at least one non-transitory computer readable storage medium of claim 14, wherein the instructions, when executed, cause the computing device to:

sample the first cognitive trajectory to identify one or more intermediate points in the cognitive space; and decode the one or more intermediate points into an input space to generate input points in the input space.

17. The at least one non-transitory computer readable storage medium of claim 16, wherein:

at least one of the adjusted activations is to be associated with an initial data point from the input space;

at least one of the adjusted activations is to be associated with a destination data point from the input space; and the cognitive initial point is to correspond to the initial data point and the cognitive destination point is to correspond to the destination data point.

18. The at least one non-transitory computer readable storage medium of claim 14, wherein the instructions, when executed, cause the computing device to:

identify a plurality of trajectories through the cognitive space;

identify coherent trajectories of the plurality of trajectories based on a logical sequences of points of the coherent trajectories being identified as being similar to each other;

identify incoherent trajectories of the plurality of trajectories based on an illogical sequence of points of the incoherent trajectories being dissimilar to each other; and generate a validity score based on a ratio of the coherent trajectories and the incoherent trajectories.

19. The at least one non-transitory computer readable storage medium of claim 14, wherein the neural network is to be associated with the first number of dimensions and the cognitive space is to be associated with the second number of dimensions, wherein the second number of dimensions is to be less than the first number of dimensions.

20. A method comprising:

identifying a cognitive space that is to be a compressed representation of activations of a neural network;

executing, with the neural network, a process to generate an output based on an input, wherein the neural network is to generate a plurality of activations as part of the process, and wherein the plurality of activations has a first number of dimensions;

reducing the first number of dimensions of the plurality of activations to a second number of dimensions to obtain adjusted activations;

mapping the adjusted activations of the neural network to a cognitive initial point and a cognitive destination point in the cognitive space; and generating a first cognitive trajectory through the cognitive space, wherein the first cognitive trajectory traverses the cognitive space from the cognitive initial point to the cognitive destination point.

21. The method of claim 20, further including:
determining whether to retrain the neural network based on whether a validity score associated with the first cognitive trajectory meets a threshold.

22. The method of claim 20, further including:
sampling the first cognitive trajectory to identify one or more intermediate points in the cognitive space; and
decoding the one or more intermediate points into an input space to generate input points in the input space.

23. The method of claim 22, wherein:
at least one of the adjusted activations is to be associated with an initial data point from the input space;
at least one of the adjusted activations is to be associated with a destination data point from the input space; and
the cognitive initial point is to correspond to the initial data point and the cognitive destination point is to correspond to the destination data point.

24. The method of claim 20, further including:
identifying a plurality of trajectories through the cognitive space;
identifying coherent trajectories of the plurality of trajectories based on a logical sequences of points of the coherent trajectories being identified as being similar to each other;
identifying incoherent trajectories of the plurality of trajectories based on an illogical sequence of points of the incoherent trajectories being dissimilar to each other; and
generating a validity score based on a ratio of the coherent trajectories and the incoherent trajectories.

25. The method of claim 20, wherein the neural network is to be associated with the first number of dimensions and the cognitive space is to be associated with the second number of dimensions, wherein the second number of dimensions is less than the first number of dimensions.

* * * * *